(12) United States Patent
Russell et al.

(10) Patent No.: US 8,248,114 B2
(45) Date of Patent: Aug. 21, 2012

(54) CIRCUIT HAVING SAMPLE AND HOLD FEEDBACK CONTROL AND METHOD

(75) Inventors: Anthony Gerard Russell, San Jose, CA (US); Christopher Ben Bartholomeusz, San Jose, CA (US)

(73) Assignee: Semiconductor Components Industries, LLC, Phoenix, AZ (US)

( * ) Notice: Subject to any disclaimer, the term of this patent is extended or adjusted under 35 U.S.C. 154(b) by 0 days.

(21) Appl. No.: 12/579,014

(22) Filed: Oct. 14, 2009

(65) Prior Publication Data

US 2011/0084734 A1    Apr. 14, 2011

(51) Int. Cl.
*H03K 3/00*    (2006.01)
(52) U.S. Cl. ........................................ 327/108
(58) Field of Classification Search .................. None
See application file for complete search history.

(56) References Cited

U.S. PATENT DOCUMENTS

| | | | |
|---|---|---|---|
| 6,586,980 B1 | 7/2003 | Callahan, Jr. | |
| 6,747,420 B2 | 6/2004 | Barth et al. | |
| 6,798,152 B2 | 9/2004 | Rooke et al. | |
| 6,987,787 B1 | 1/2006 | Mick | |
| 7,102,339 B1 | 9/2006 | Ferguson | |
| 7,102,340 B1 | 9/2006 | Ferguson | |
| 7,202,608 B2 | 4/2007 | Robinson et al. | |
| 7,276,863 B2 | 10/2007 | Lee et al. | |
| 7,321,203 B2 * | 1/2008 | Marosek | 315/247 |
| 7,358,681 B2 | 4/2008 | Robinson et al. | |
| 7,420,335 B2 | 9/2008 | Robinson et al. | |
| 2006/0261754 A1 | 11/2006 | Lee | |
| 2007/0285159 A1 * | 12/2007 | Moyer | 330/11 |

* cited by examiner

*Primary Examiner* — Lincoln Donovan
*Assistant Examiner* — Khareem E Almo
(74) *Attorney, Agent, or Firm* — Rennie William Dover

(57) ABSTRACT

A drive circuit and a method for maintaining an operating state of the drive circuit. The drive circuit includes a capacitor connected to an inverting input terminal of an operational amplifier and to a terminal of a current sensitive load through a switch. The output of the operational amplifier is connected to a switching regulator which has an output terminal connected to another terminal of the current sensitive load. An energy storage element is connected to the inverting input terminal of the operational amplifier. Energy is stored in the energy storage element during a first portion of a PWM pulse which is used during a second portion of the PWM pulse to generate the error signal. A drive signal is generated from the error signal where the drive signal is used to generate a voltage that biases the current source during the second portion of the PWM pulse.

17 Claims, 4 Drawing Sheets

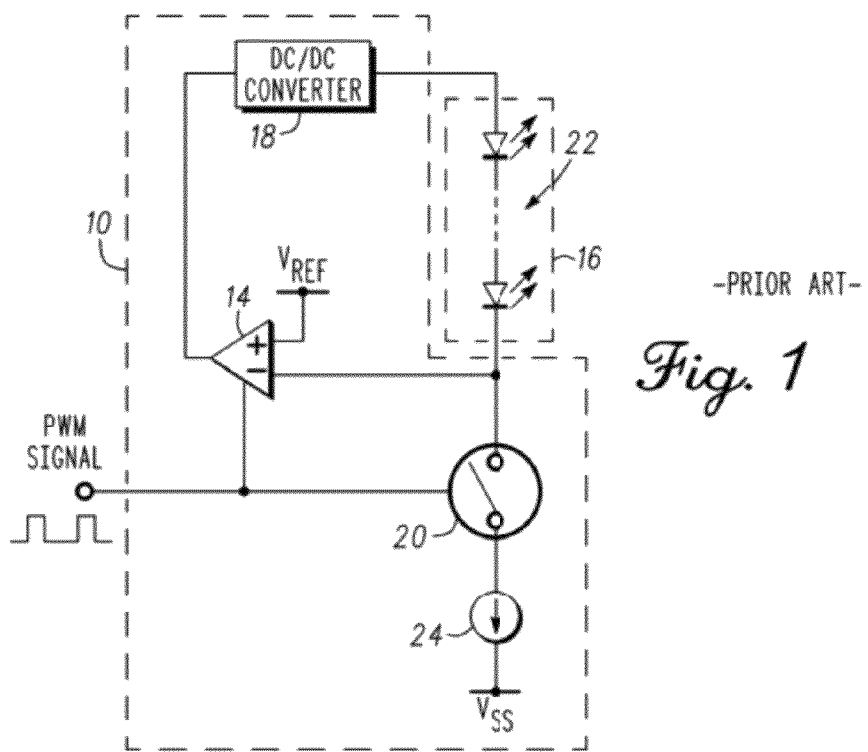
*Fig. 1* -PRIOR ART-
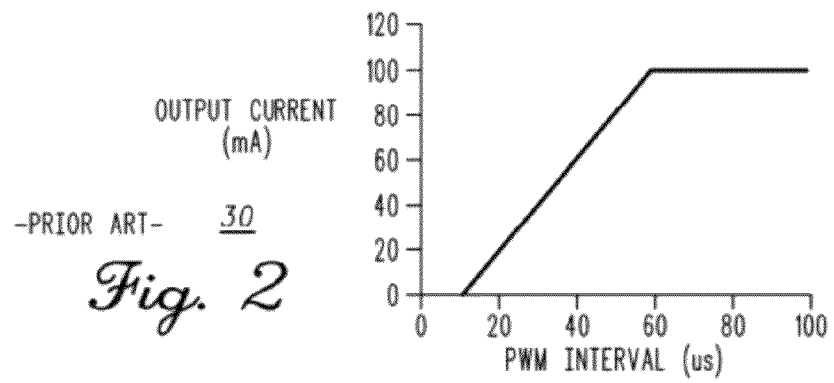
-PRIOR ART- *Fig. 2*
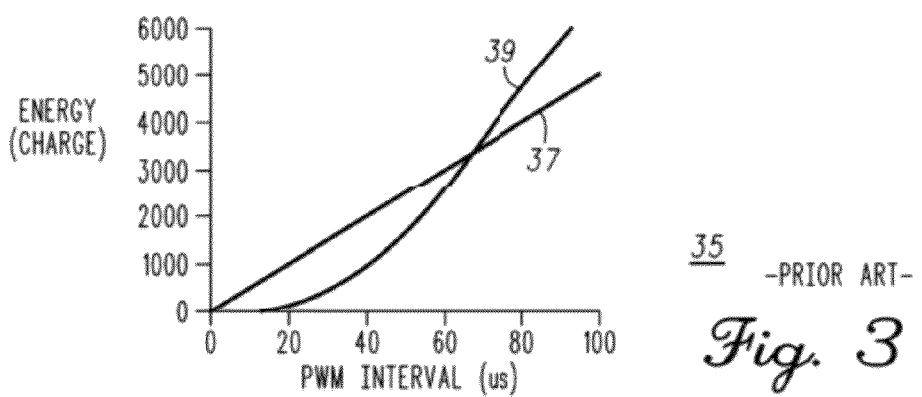
-PRIOR ART- *Fig. 3*

CIRCUIT HAVING SAMPLE AND HOLD FEEDBACK CONTROL AND METHOD

TECHNICAL FIELD

The present invention relates, in general, to electronics and, more particularly, to methods and circuits for driving a current sensitive load.

BACKGROUND

Semiconductor components are used in portable applications such as mobile telephones, portable computers, calculators, cameras, Personal Digital Assistants (PDAs), video game controllers, etc. and in non-portable applications such as mainframe computers, test equipment, automotive, communications, manufacturing, etc. In some of these applications it may be desirable for the semiconductor components to drive a current sensitive load or device such as, for example, a Light Emitting Diode (LED). An LED is referred to as a current sensitive device because the brightness of the LED is controlled by the amount of current flowing through the LED. A common technique for driving an LED involves the use of a Pulse Width Modulation (PWM) signal. FIG. 1 illustrates an example of an LED load driven by a PWM signal. What is shown in FIG. 1 is a circuit schematic of a prior art driver circuit 10 operable to drive an LED string 22. Driver circuit 10 includes an operational amplifier 14 having an output terminal coupled to a current sensitive load 16 through a DC/DC converter 18. More particularly, operational amplifier 14 has an inverting input terminal, a non-inverting input terminal, an output terminal, and an enable terminal, where the output terminal is connected to the input terminal of DC/DC converter 18, the non-inverting input terminal is coupled for receiving a source of operating potential such as, for example, a reference potential $V_{REF}$, and the inverting input terminal is commonly connected to a terminal of a switch 20 and to a cathode of a diode of LED string 22. This cathode is referred to as the cathode of LED string 22. The other terminal of switch 20 is connected to a current source 24. Switch 20 has a control terminal connected to an enable terminal of operational amplifier 14 and for receiving a PWM signal. An output terminal of DC/DC converter 18 is coupled to an anode of an LED of LED string 22. This anode is referred to as the anode of LED string 22.

In operation, the PWM signal closes and opens switch 20, where closing switch 20 turns on or brightens LED string 22 and opening switch 20 dims LED string 22. When switch 20 is closed, driver circuit 10 operates in a closed loop configuration and when switch 20 is open it operates in an open loop configuration. In the closed loop configuration, current source/sink 24 sinks a constant current and LED string 20 generates a light signal. In order to sink the constant current, an adequate voltage should be delivered across current source/sink 24. This is typically achieved by sensing the voltage at the cathode terminal of LED string 22 that is connected to operational amplifier 14 and comparing it to reference voltage $V_{REF}$. In response to these input signals, operational amplifier 14 generates an error signal that is applied to DC/DC converter 18 to change, i.e., to increase or decrease, its output voltage and thereby adjust the voltage at the anode terminal of the LED of LED string 22 that is connected to the output terminal of DC/DC converter 18. Adjusting the voltage at the anode terminal of LED string 22 in turn adjusts the voltage at its cathode terminal to its target value. However, using a PWM signal as the control signal results in the forward voltage of LED string 22 switching between its nominal "on" voltage and its "off" voltage, where the "off" voltage is determined by the dark current.

As discussed above, the PWM signal dims LED string 22 by opening switch 20. During the dimming phase, i.e., when the PWM signal is inactive, the feedback loop is open, the voltage at the cathode of LED string 22 is no longer valid for determining the system feedback error signal. When the PWM signal turns on again or becomes active, switch 20 closes. However, the output power from DC/DC converter 18 may not instantaneously equal the load power needed by LED string 22. FIG. 2 is a plot 30 illustrating that there is a delay after switch 20 closes and before DC/DC converter 18 becomes capable of delivering its peak output current. By way of example, the delay is 70 microseconds. The energy demanded by LED string 22 when the PWM signal becomes active exceeds the available energy from DC/DC converter 18. Thus, the eventual steady state operating conditions cannot sustain the constant current desired by LED string 22 for a PWM pulse having a duration of less than 70 microseconds. Under this condition, constant current regulation is lost and the PWM dimming becomes nonlinear. FIG. 3 is a plot 35 illustrating the energy available versus the interval of the PWM signal. In FIG. 3, the line identified by reference character 37 illustrates the energy or charge needed by DC/DC converter 18 so that it can provide sufficient energy for LED string 22. The line identified by reference character 39 is the energy available to LED string 22. For the first 70 microseconds, the energy available to LED string 22 is less than the energy needed by LED string 22. A drawback with this system is that the minimum useful PWM pulse timing is restricted, which limits the system performance. Although a DC/DC converter having a faster response may help with the system performance, it increases the cost of the system and may introduce additional problems such as unwanted Electromagnetic Interference (EMI) noise.

Accordingly, it would be advantageous to have a structure and method capable of using PWM in systems having current sensitive loads such as, for example, LED strings that are driven by a switching regulator and that do not introduce additional error sources. It would be of further advantage for the structure and method to be cost efficient to implement.

BRIEF DESCRIPTION OF THE DRAWINGS

The present invention will be better understood from a reading of the following detailed description, taken in conjunction with the accompanying drawing figures, in which like reference characters designate like elements and in which:

FIG. 1 is a circuit schematic of a prior art driver circuit suitable for driving a current sensitive load;

FIG. 2 is a plot of a peak output response for the driver circuit of FIG. 1;

FIG. 3 is a plot of the available energy versus time for the driver circuit of FIG. 2;

DETAILED DESCRIPTION

Generally the present invention provides a circuit having a sample and hold feedback control scheme and a method for operating the circuit. In accordance with an embodiment of the present invention, a cathode voltage sense signal is sampled onto a capacitor during a PWM active phase interval. During a subsequent PWM inactive phase interval, the sampled voltage is available to provide a feedback signal for use by a switching regulator. In accordance with another embodiment, an operating forward voltage of an LED string is stored onto a capacitor during the PWM active phase and this stored voltage allows continued adjustment of a voltage at an anode terminal of the LED string during the PWM inactive phase. An advantage of embodiments of the present invention is that the voltage at the anode terminal of the LED string can be adjusted by a weighting factor during the PWM inactive phase by using, for example, a capacitor divider network.

Figure 4:
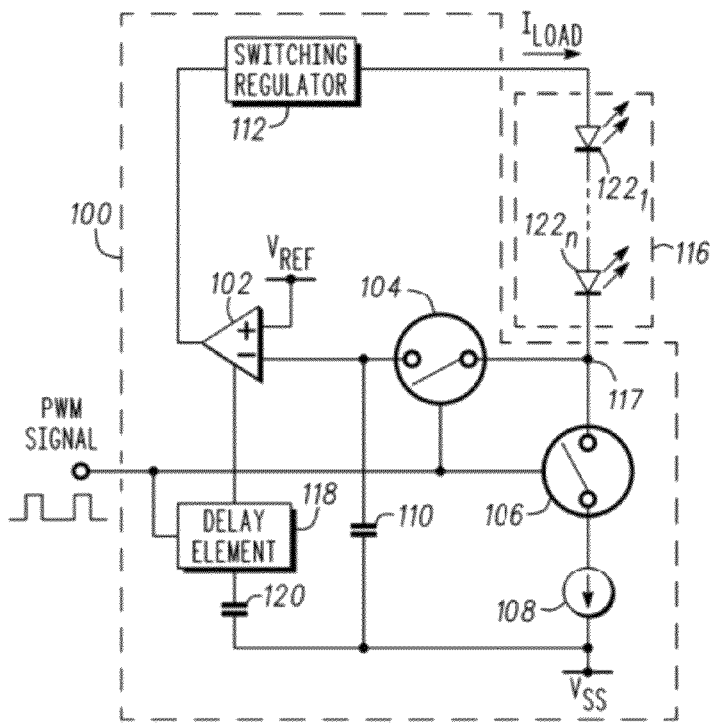
FIG. 4 is schematic diagram of a driver circuit for driving a current sensitive load in accordance with an embodiment of the present invention.

FIG. 4 is a circuit schematic of a monolithically integrated driver circuit 100 in accordance with an embodiment of the present invention. What is shown in FIG. 4 is an operational amplifier 102 having an output terminal coupled to a current sensitive load 116 through a switching regulator 112. More particularly, operational amplifier 102 has an inverting input terminal, a non-inverting input terminal, an output terminal, and an enable terminal, where the output terminal is connected to an input terminal of switching regulator 112, the non-inverting input terminal is coupled for receiving a source of potential such as, for example, a reference potential $V_{REF}$, and the inverting input terminal is commonly connected to a terminal of a switch 104 and to a terminal of an energy storage element 110. By way of example, energy storage element 110 is a sample and hold capacitor which can be a discrete capacitor or a monolithically integrated portion of driver circuit 100. In addition, switch 104 has a second terminal commonly connected to terminals of switch 106 and current sensitive load 116 to form a node 117. Switch 106 has another terminal coupled to a current source/sink 108. Switches 104 and 106 have control terminals that are connected to each other and to an input terminal of a PWM delay element 118. Preferably, delay element 118 is a falling edge triggered delay element that delays when the falling edges of a PWM pulse begins, i.e., it stretches the width of the pulses of the PWM signal. The control terminals of switches 104 and 106 and the input terminal of PWM delay element 118 are coupled for receiving a PWM pulse or PWM signal, which serves as a control signal. Sample and hold capacitor 110 and current source/sink 108 each have a terminal coupled for receiving a source of operating potential $V_{SS}$. By way of example, source of operating potential $V_{SS}$ is a ground potential.

Delay element 118 has an input terminal connected to a terminal of a delay capacitor 120 and an output terminal connected to the enable terminal of operational amplifier 102. The other terminal of delay capacitor 120 is coupled for receiving source of operating potential $V_{SS}$. It should be noted that delay element 118 and capacitor 120 are optional features that may be omitted. An output terminal of switching regulator 112 is connected to a terminal of load 116 and delivers a drive signal to load 116. By way of example, driver circuit 100 is operable to drive a current sensitive load such as a Light Emitting Diode (LED), a string or a plurality of series-connected LEDS, etc. By way of example, current sensitive load 116 is comprised of a plurality of LEDS $122_1, \ldots, 122_n$ that are connected in a series configuration. More particularly, an anode of LED $122_1$ is connected to the output terminal of switching regulator 112, the cathode of LED $122_1$ is coupled to the anode of LED $122_n$, and the cathode of LED $122_n$ is connected to the commonly connected terminals of switches 104 and 106. Thus the anode of LED $122_1$ and the cathode of LED $122_n$ serve as terminals of current sensitive load 116. LEDS $122_1, \ldots, 122_n$ are also referred to as a string of LEDS. The subscript "n" that is appended to reference character 122 is an integer, which is intended to indicate that the string of LEDS may be comprised of one, two, three, etc. LEDS, where the LEDS are connected in series when there is more than one LED. As mentioned above, current sensitive load 116 may be comprised of a single LED, e.g., LED $122_1$, having its anode connected to the output terminal of switching regulator 112 and its cathode commonly connected to switches 104 and 106.

In operation, a PWM pulse or signal transitions from a logic low voltage level to a logic high voltage level which closes switches 104 and 106, thereby closing the feedback loop for driver circuit 100. When the pulse is at a logic high voltage level it is referred to as a first portion of the pulse. Closing switch 104 connects the cathode of LED $122_n$ to the inverting input terminal of operational amplifier 102 and closing switch 106 connects the cathode of LED $122_n$ to current source/sink 108. With current source/sink 108 connected to the cathode of LED $122_n$, a constant current $I_{LOAD}$ flows through LEDS $122_1, \ldots, 122_n$. In response to current $I_{LOAD}$ and the output voltage from switching regulator 112, LEDS $122_1, \ldots, 122_n$ emit light. While switches 104 and 106 are in the closed position, sample and hold capacitor 110 is charged to the voltage level at the cathode of LED $122_n$, i.e., at node 117. In other words, energy is stored in sample and hold capacitor 110 while switches 104 and 106 are closed. In addition to charging sample and hold capacitor 110, timing capacitor 120 is charged to a voltage level that sets the delay time for delay element 118. In the closed loop configuration, current source/sink 108 sinks current $I_{LOAD}$ and LEDS $122_1, \ldots, 122_n$ generate a light signal. In order to sink current $I_{LOAD}$, an adequate voltage should be delivered to node 117. This is typically achieved by sensing the voltage at the cathode of LED $122_n$ that is connected to operational amplifier 102 and comparing it to reference voltage $V_{REF}$. Operational amplifier 102 generates an error signal that is applied to switching regulator 112 to change, i.e., to increase or decrease, its output voltage and thereby adjust the voltage at the anode of LED $122_1$. Adjusting the voltage at the anode of LED $122_1$ in turn adjusts the voltage at the cathode of LED $122_n$ to its target value, i.e., adjusting the voltage at the anode terminal of LED string $122_1, \ldots, 122_n$ adjusts the voltage at the cathode terminal of LED string $122_1, \ldots, 122_n$.

When the PWM pulse is at a logic low voltage level, switches 104 and 106 are open. This portion of the pulse may be referred to as the second portion. With switches 104 and 106 open, the energy stored in capacitor 110 during the first portion of the pulse is used to generate an error signal. More particularly, the energy stored in capacitor 110 provides an input signal to the inverting input terminal of operational amplifier 102 which generates an error signal at its output terminal. The error signal is representative of the voltage that appeared at the cathode of LED $122_n$, i.e., at node 117, when switches 104 and 106 were closed. In response to the error signal, switching regulator 112 generates an output voltage at its output terminal that is applied to load 116, i.e., LEDS $122_1, \ldots, 122_n$. The output voltage of switching regulator 112 is referred to as a drive signal or a drive voltage and is used to generate a voltage at node 117. The voltage at node 117 is the difference between the output voltage of switching regulator 112 and the voltage across load 116. Thus the error signal maintains the feedback control loop in an active state even though the PWM pulse is at a logic low voltage level. In addition, delay element 118 and delay capacitor 120 operate as a timer circuit that, in conjunction with the signal from sample and hold capacitor 110, extend the amount of time over which the feedback error signal is transmitted to switching regulator 112. This is accomplished by delaying the start of the falling edge of the pulses of the PWM signal. The capacitance value of delay capacitor 120 can be selected to adjust the amount of time over which the feedback control loop is maintained after opening switches 104 and 106 to accommodate the response time delay of switching regulator 112.

Figure 5:
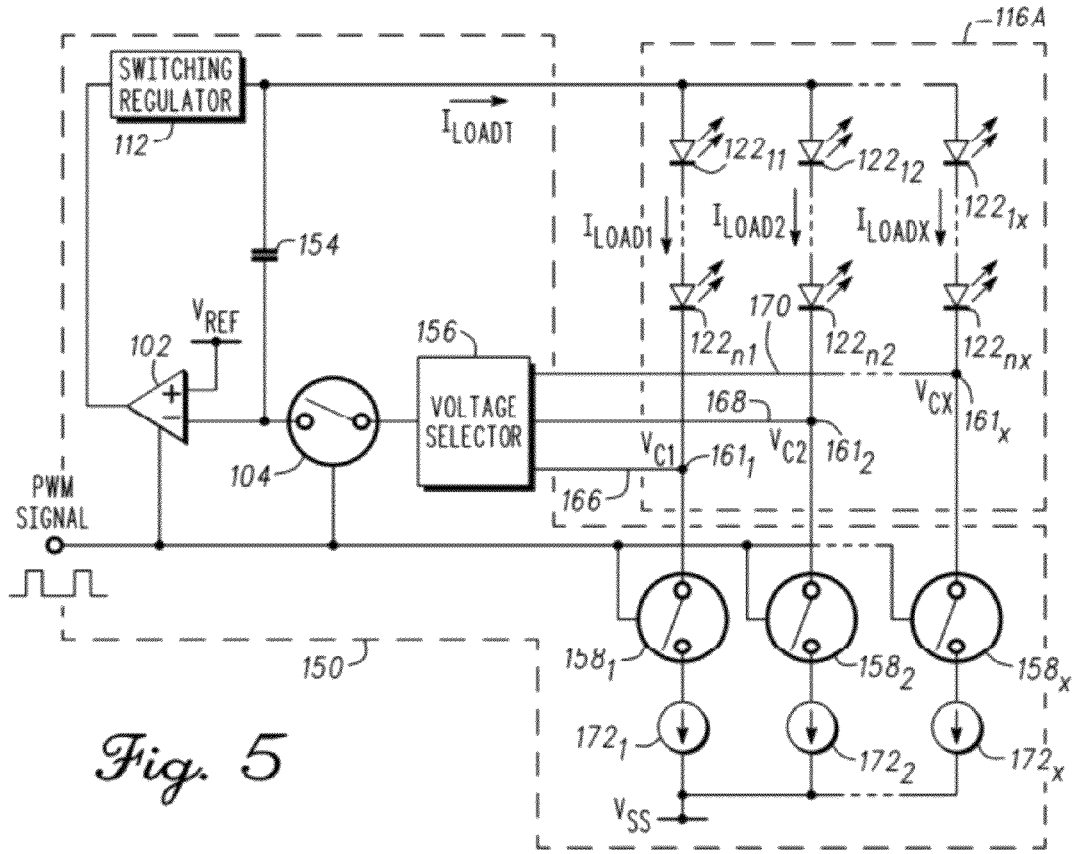
FIG. 5 is schematic diagram of a driver circuit for driving a current sensitive load in accordance with another embodiment of the present invention.

FIG. 5 is a circuit schematic of a monolithically integrated driver circuit 150 driving a load 116A in accordance with another embodiment of the present invention. What is shown in FIG. 5 is an operational amplifier 102 having an output terminal coupled to a current sensitive load 116A through a switching regulator 112. More particularly, operational amplifier 102 has an inverting input terminal, a non-inverting input terminal, an output terminal, and an enable terminal, where the output terminal is connected to the input terminal of switching regulator 112, the non-inverting input terminal is coupled for receiving a source of potential such as, for example, a reference potential $V_{REF}$, and the inverting input terminal is commonly connected to a terminal of a switch 104 and to a terminal of a sample and hold capacitor 154. It should be noted that capacitor 154 may be a discrete capacitor or a monolithically integrated portion of driver circuit 150.

Switch 104 has a second terminal connected to an output terminal of a selector circuit 156. Preferably, a voltage appearing on the output terminal of selector circuit 156 is substantially the same as the lowest voltage level appearing on its input terminals. Driver circuit 150 includes switches $158_1$, $158_2$, ..., $158_x$ where switch $158_1$ has a terminal connected to an input terminal 166 of selector circuit 156, a terminal connected to a current source $172_1$, and a control terminal commonly connected to the control terminals of switches 104, $158_2$, ..., $158_x$ and to the enable input terminal of operational amplifier 102. The control terminals of switches 104, $158_1$, $158_2$, ..., $158_x$ are also coupled for receiving a pulse signal such as, for example, a pulse signal that is part of a pulse width modulated signal.

A cathode of an LED $122_{n1}$ that is part of a string of LEDS $122_{11}$, ..., $122_{n1}$ is connected to input terminal 166 and to the terminal of switch $158_1$ to form a node $161_1$. Switch $158_2$ has a terminal connected to an input terminal 168 of selector circuit 156, a terminal connected to a current source $172_2$, and a control terminal commonly connected to the control terminals of switches 104, $158_1$, and $158_x$ and to the enable input terminal of operational amplifier 102. The control terminals of switches 104, $158_1$, and $158_x$ that are commonly connected together are also coupled for receiving a pulse signal such as, for example, a pulse signal that is part of a pulse width modulated signal. Switch $158_x$ has a terminal connected to an input terminal 170 of selector circuit 156, a terminal connected to a current source $172_x$, and a control terminal commonly connected to the control terminals of switches 104, $158_1$, and $158_2$ and to the enable input terminal of operational amplifier 102, and coupled for receiving a pulse signal such as, for example, a pulse signal that is part of a pulse width modulated signal. A cathode of an LED $122_{n2}$ that is part of a string of LEDS $122_{12}$, ..., $122_{n2}$ is connected to input terminal 168 and to the terminal of switch $158_2$ to form a node $161_2$. A cathode of an LED $122_{nx}$ that is part of a string of LEDS $122_{1x}$, ..., $122_{nx}$ is connected to input terminal 170 and to the terminal of switch $158_x$ to form a node $161_x$. Strings of LEDS $122_{11}$, ..., $122_{n1}$, $122_{12}$, ..., $122_{n2}$, and $122_{1x}$, ..., $122_{nx}$ are further described below. Switches $158_1$, $158_2$, ..., $158_x$ have another terminal coupled to a current source/sinks $171_1$, $171_2$, ..., $171_x$, respectively. Sample and hold capacitor 154 has a terminal commonly connected to a terminal of switch 104 and to the inverting input terminal of operational amplifier 102 and another terminal connected to the output terminal of switching regulator 112 and to the anodes of LEDS $122_{11}$, $122_{12}$, ..., $122_{1x}$.

Driver circuit 150 shown in FIG. 5 drives current sensitive load 116A which is comprised of a plurality of series connected LEDS $122_{11}$, ..., $122_{n1}$, a plurality of series connected LEDS $122_{12}$, ..., $122_{n2}$, and a plurality of series connected LEDS $122_{1x}$, ..., $122_{nx}$. Each set of series connected LEDS may be referred to as a string of LEDS. An anode of LED $122_{11}$ is connected to the output terminal of switching regulator 112, the cathode of LED $122_{11}$ is coupled to the anode of LED $122_{n1}$, and the cathode of LED $122_{n1}$ is connected to terminal 166 and to a terminal of switch $158_1$ at node $161_1$; an anode of LED $122_{12}$ is connected to the output terminal of switching regulator 112, the cathode of LED $122_{12}$ is coupled to the anode of LED $122_{n2}$, and the cathode of LED $122_{n2}$ is connected to terminal 168 and to a terminal of switch $158_2$ at node $161_2$; and an anode of LED $122_{1x}$ is connected to the output terminal of switching regulator 112, the cathode of LED $122_{1x}$ is coupled to the anode of LED $122_{nx}$, and the cathode of LED $122_{nx}$ is connected to terminal 170 and to a terminal of switch $158_x$ at node $161_x$. The anodes of LEDS $122_{11}$, $122_{12}$, ..., $122_{n1}$ that are commonly connected together and to the output terminal of switching regulator 112 may be referred to as the anode terminal of the plurality of strings of LEDS $122_{11}$, ..., $122_{n1}$, $122_{12}$, ..., $122_{n2}$, and $122_{1x}$, ..., $122_{nx}$, i.e., load 116A. The subscript "n" that is appended to reference character 122 is an integer, which is intended to indicate that the string of LEDS may be comprised of one, two, three, etc. LEDS, where the LEDS are connected in series when there is more than one LED. The subscript "x" that is appended to reference character 122 is an integer, which is intended to indicate that there may be one or more strings of LEDS. It should be noted that each string of LEDS may be comprised of a single LED, e.g., LEDS $122_{11}$, $122_{12}$, ..., $122_{1x}$ each having its anode connected to the output terminal of switching regulator 112 and each having its cathode commonly connected to switches 104 and 106.

In operation, a PWM pulse or signal transitions from a logic low voltage level to a logic high voltage level which closes switches 104, $158_1$, $158_2$, and $158_x$, thereby closing the feedback loop for driver circuit 150. This portion of the pulse may be referred to as a first portion of the pulse. Closing switch 104 connects the output terminal of voltage selector 156 to the inverting input terminal of operational amplifier 102; closing switch $158_1$ connects input terminal 166 and the cathode of LED $122_{n1}$ to current source/sink $172_1$; closing switch $158_2$ connects input terminal 168 and the cathode of LED $122_{n1}$ to current source/sink $172_2$; and closing switch $158_x$ connects input terminal 170 and the cathode of LED $122_{nx}$ to current source/sink $172_x$. With current source/sinks $172_1$, ..., $172_x$ connected to the cathodes of LEDS $122_{n1}$, ..., $122_{nx}$, a constant load current $I_{LOAD1}$ flows through LEDS $122_{11}$, ..., $122_{n1}$, a constant load current $I_{LOAD2}$ flows through LEDS $122_{12}$, ..., $122_{n2}$, and a constant load current $I_{LOADx}$ flows through LEDS $122_{1x}$, ..., $122_{nx}$. The sum of load currents $I_{LOAD1}$, $I_{LOAD2}$, ..., $I_{LOADx}$ is referred to as a total load current $I_{LOADT}$.

In response to current $I_{LOAD1}$ and the output voltage from switching regulator 112, LEDS $122_{11}, \ldots, 122_{n1}$ emit light and a voltage $V_{C1}$ appears on input terminal 166, i.e., at node $161_1$; in response to current $I_{LOAD2}$ and the output voltage from switching regulator 112, LEDS $122_{12}, \ldots, 122_{n2}$ emit light and a voltage $V_{C2}$ appears on input terminal 168, i.e., at node $161_2$; and in response to current $I_{LOADx}$ and the output voltage from switching regulator 112, LEDS $122_{1x}, \ldots, 122_{nx}$ emit light and a voltage $V_{Cx}$ appears on input terminal 170, i.e., at node $161_x$. While switches 104 and $158_1$ are in the closed position, energy is stored in sample and hold capacitor 154, i.e., capacitor 154 is charged to the voltage level of the input terminal 166, 168, or 170 having the lowest voltage level. In order to sink the constant current, an adequate voltage should be delivered across current source/sinks $172_1$, $172_2, \ldots, 172_x$, i.e., to nodes $161_1, 161_2, \ldots, 161_x$, respectively. The voltage appearing at the output terminal of voltage selector 156 is input to the inverting input terminal of operational amplifier 102. In response to the voltage at the inverting input terminal and reference voltage $V_{REF}$, operational amplifier 102 generates an error signal that is applied to switching regulator 112 to change, i.e., to increase or decrease, its output voltage and thereby adjust the voltage at the anodes of LEDS $122_{11}, 122_{12}, \ldots, 122_{1x}$. Adjusting the voltage at the anodes of LEDS $122_{11}, 122_{12}, \ldots, 122_{1x}$ in turn adjusts the voltage at their respective cathodes to their target values.

When the pulse of the PWM signal is at a logic low voltage level, switches 104, $158_1$, $158_2$, ..., $158_x$ are open. This portion of the pulse signal may be referred to as a second portion. With switches 104, $158_1$, $158_2$, ..., $158_x$ open, the energy stored in capacitor 154 is used to generate an error signal. More particularly, the energy stored in capacitor 154 provides an input signal to the inverting input terminal of operational amplifier 102 which generates an error signal at its output terminal. The error signal is representative of the voltage that appeared at the output terminal of voltage selector 156 when switches 104, $158_1$, $158_2$, ..., $158_x$ were closed. In response to the error signal, switching regulator 112 generates an output voltage at its output terminal that is applied to load 116A, i.e., LEDS $122_{11}, \ldots, 122_{n1}$, LEDS $122_{12}, \ldots, 122_{n2}$, and LEDS $122_{1x}, \ldots, 122_{nx}$. The output voltage of switching regulator 112 is referred to as a drive signal or a drive voltage and is used to generate voltages at nodes $161_1$, $161_2, \ldots, 161_x$. The voltage at node $161_1$ is the difference between the output voltage of switching regulator 112 and the voltage across LEDS $122_{11}, \ldots, 122_{n1}$; the voltage at node $161_2$ is the difference between the output voltage of switching regulator 112 and the voltage across LEDS $122_{12}, \ldots, 122_{n2}$; and the voltage at node $161_x$ is the difference between the output voltage of switching regulator 112 and the voltage across LEDS $122_{1x}, \ldots, 122_{nx}$. The voltages at nodes $161_1$, $161_2, \ldots, 161_x$ maintain current source/sinks $172_1, 172_2, \ldots 172_x$, respectively, in an active operating mode. Thus the error signal maintains the feedback control loop in an active state even though the PWM pulse is at a logic low voltage level.

Figure 6:
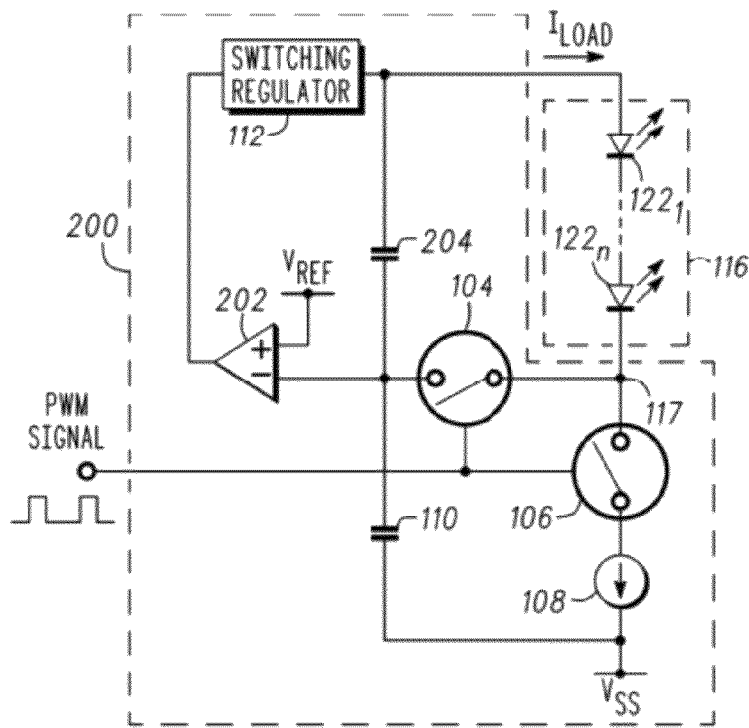
FIG. 6 is schematic diagram of a driver circuit for driving a current sensitive load in accordance with another embodiment of the present invention.

FIG. 6 is a circuit schematic of a monolithically integrated driver circuit 200 in accordance with another embodiment of the present invention. What is shown in FIG. 6 is an operational amplifier 202 having an output terminal coupled to a current sensitive load 116 through a switching regulator 112. More particularly, operational amplifier 202 has an inverting input terminal, a non-inverting input terminal, and an output terminal, where the output terminal is connected to an input terminal of switching regulator 112, the non-inverting input terminal is coupled for receiving a source of potential such as, for example, a reference potential $V_{REF}$, and the inverting input terminal is commonly connected to a terminal of switch 104, to a terminal of a sample and hold capacitor 110, and to a terminal of a sample and hold capacitor 204. Capacitor 204 may be referred to as an energy storage element. The other terminal of sample and hold capacitor 204 is commonly connected to the output terminal of switching regulator 112 and to a terminal of load 116. It should be noted that capacitors 110 and 204 may be discrete capacitors or monolithically integrated portions of driver circuit 200. In addition, switch 104 has a second terminal commonly connected to terminals of switch 106 and current sensitive load 116. Switch 106 has another terminal coupled to a current source/sink 108. Switches 104 and 106 have control terminals that are connected to each other and coupled for receiving a control signal. Sample and hold capacitor 110 has another terminal which is coupled for receiving a source of operating potential $V_{SS}$. Preferably, source of operating potential $V_{SS}$ is a ground potential.

As discussed above, the output terminal of switching regulator 112 is connected to a terminal of load 116. By way of example, driver circuit 200 is operable to drive a current sensitive load such as a Light Emitting Diode (LED), a string or a plurality of series-connected LEDS, a plurality of strings of LEDS that are connected in a parallel configuration, etc. Current sensitive load 116 may be comprised of a plurality of LEDS $122_1, \ldots, 122_n$ that are connected in a series configuration. More particularly, an anode of LED $122_1$ is connected to the output terminal of switching regulator 112, the cathode of LED $122_1$ is coupled to the anode of LED $122_n$, and the cathode of LED $122_n$ is connected to the commonly connected terminals of switches 104 and 106 to form node 117. Thus the anode of LED $122_1$ and the cathode of LED $122_n$ serve as terminals of current sensitive load 116. LEDS $122_1, \ldots, 122_n$ are also referred to as a string of LEDS. The subscript "n" that is appended to reference character 122 is an integer, which is intended to indicate that the string of LEDS may be comprised of one, two, three, etc. LEDS, where the LEDS are series connected when there are two or more LEDS. As mentioned above, current sensitive load 116 may be comprised of a single LED, e.g., LED $122_1$ having its anode connected to the output terminal of switching regulator 112 and its cathode commonly connected to switches 104 and 106.

In operation, a PWM pulse or signal transitions from a logic low voltage level to a logic high voltage level which closes switches 104 and 106, thereby closing the feedback loop for driver circuit 200. This may be referred to as a first portion of the pulse or signal. Closing switch 104 connects the cathode of LED $122_n$ to the inverting input terminal of operational amplifier 202 and closing switch 106 connects the cathode of LED $122_n$ to current source/sink 108. With current source/sink 108 connected to the cathode of LED $122_n$, a constant current $I_{LOAD}$ flows through LEDS $122_1, \ldots, 122_n$. In response to current $I_{LOAD}$ and the output voltage from switching regulator 112, LEDS $122_1, \ldots, 122_n$ emit light. While switches 104 and 106 are in the closed position, energy is stored in the sample and hold capacitors 110 and 204. The energy charges capacitors 110 and 204 to the voltage level present at the cathode of LED $122_n$, i.e., the voltage level at node 117. In the closed loop configuration, current source/sink 108 sinks a constant current and LEDS $122_1, \ldots, 122_n$ generate a light signal. In order to sink the constant current, an adequate voltage should be delivered at node 117 or across current source/sink 108. This is typically achieved by sensing the voltage at the cathode of LED $122_n$ that is connected to operational amplifier 202 and comparing it to reference voltage $V_{REF}$. Operational amplifier 202 generates an error signal that is applied to switching regulator 112 to change, i.e., to increase or decrease, its output voltage and thereby adjust the voltage at the anode of LED $122_1$. Adjusting the voltage at the anode of LED $122_1$ in turn adjusts the voltage at the cathode of LED $122_n$ to its target value, i.e., adjusting the voltage at the anode of LED $122_1$ adjusts the voltage of the anode terminal of LED string $122_1, \ldots, 122_n$ which adjusts the voltage at the cathode terminal of LED string $122_n$. More particularly, the voltage at node 117 may be determined by subtracting the voltage across LEDS $122_1, \ldots, 122_n$ from the voltage at the output of switching regulator 112. The voltage at the output of switching regulator 112 is also referred to as the drive voltage.

When the PWM signal is at a logic low voltage level, switches 104 and 106 are open. The pulse signal at the logic low voltage level may be referred to as being a second portion of the pulse. With switches 104 and 106 open, capacitors 110 and 204 provide an error signal representative of the voltage or error signal that appeared at the cathode of LED $122_n$, i.e., node 117, when switches 104 and 106 were closed. The error signal maintains the feedback control loop in an active state even though the PWM pulse is at a logic low voltage level. In addition, including sample and hold capacitor 204 further modifies the signal component of the error signal provided by the anode of LED $122_1$. Preferably, sample and hold capacitors 110 and 204 have the same capacitance value. With source of operating potential $V_{SS}$ coupled for receiving a ground potential, one terminal of sample and hold capacitor 110 is coupled for receiving a ground potential and capacitors 110 and 204 function as a capacitor divider network such that the effective voltage contribution, when the PWM pulse is at a logic low voltage level and capacitors 110 and 204 have the same capacitance value, is reduced by a factor of two. Thus, providing sample and hold capacitors 110 and 204 provides or introduces a user controllable weighting factor to the feedback error signal.

Figure 7:
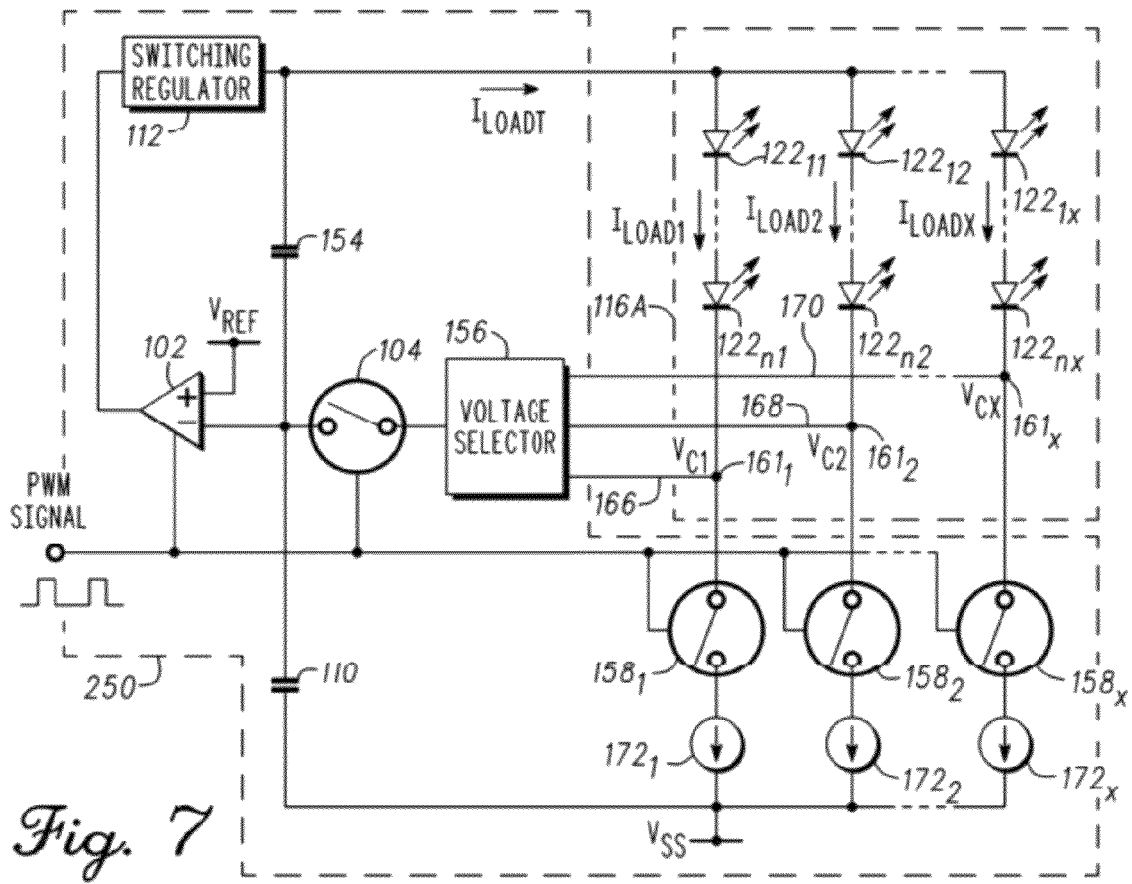
FIG. 7 is schematic diagram of a driver circuit for driving a current sensitive load in accordance with another embodiment of the present invention.

FIG. 7 is a circuit schematic of monolithically integrated driver circuit 250 connected to a current sensitive load 116A in accordance with another embodiment of the present invention. Driver circuit 250 includes operational amplifier 102, sample and hold capacitor 154, voltage selector 156, switches $158_1, 158_2, \ldots, 158_x$, current sources $172_1, 172_2, \ldots, 172_n$, and strings of LEDS $122_{11}, \ldots, 122_{n1}, 122_{12}, \ldots, 122_{n2}$, and $122_{1x}, \ldots, 122_{nx}$, which were discussed with reference to FIG. 5. Driver circuit 250 further includes a sample and hold capacitor 110 having a terminal commonly connected to capacitor 154, the inverting input terminal of operational amplifier 102, and to switch 104 and a terminal connected to the output terminal of switching regulator 112.

The operation of driver 250 driving strings of LEDS is similar to that of driver 150 except that capacitors 154 and 110 function as a capacitor divider network such that the effective voltage contribution during the PWM off pulse is reduced by a factor of two when capacitors 110 and 154 have the same capacitance value. It should be noted that load 116A may be comprised of two or more LEDS $122_{1x}, \ldots, 122_{nx}$ in parallel with each other.

Figure 8:
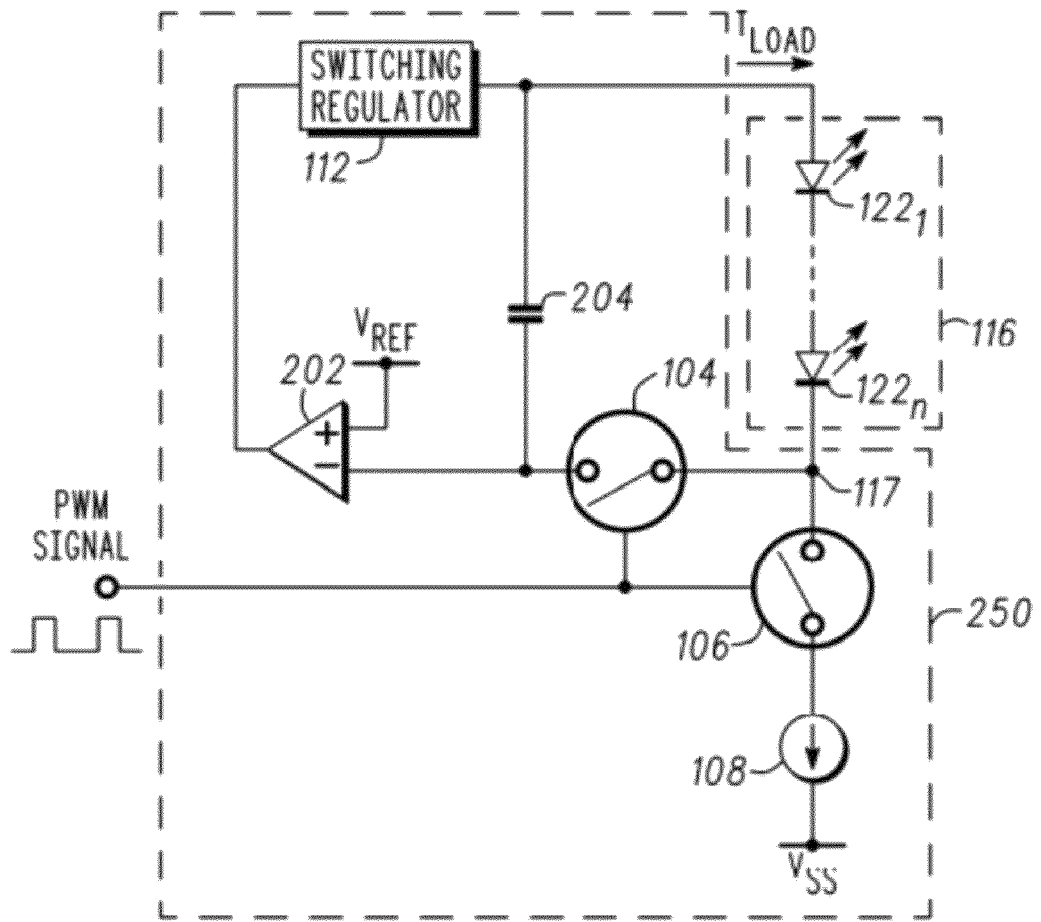
FIG. 8 is schematic diagram of a driver circuit for driving a current sensitive load in accordance with another embodiment of the present invention.

FIG. 8 is a circuit schematic of a monolithically integrated driver circuit 300 in accordance with another embodiment of the present invention. Driver circuit 300 is similar to driver circuit 200 shown in FIG. 6 except that driver circuit 300 does not include sample and hold capacitor 110.

In operation, a PWM pulse or signal transitions from a logic low voltage level to a logic high voltage level which closes switches 104 and 106, thereby closing the feedback loop for driver circuit 300. This portion of the PWM pulse may be referred to as the first portion. Closing switch 104 connects the cathode of LED $122_n$ to the inverting input terminal of operational amplifier 202 and closing switch 106 connects the cathode of LED $122_n$ to current source/sink 108. With current source/sink 108 connected to the cathode of LED $122_n$, a constant current $I_{LOAD}$ flows through LEDS $122_1, \ldots, 122_n$. In response to current $I_{LOAD}$ and the output voltage from switching regulator 112, LEDS $122_1, \ldots, 122_n$ emit light and capacitor 204 is charged to store the forward voltage across LED string $122_1, \ldots, 122_n$. While switches 104 and 106 are in the closed position, capacitor 204 is charged to the voltage level at the cathode of LED $122_n$. In the closed loop configuration, current source/sink 108 sinks a constant current and LEDS $122_1, \ldots, 122_n$ generate a light signal. In order to sink current $I_{LOAD}$, an adequate voltage should be delivered across current source/sink 108. This is typically achieved by sensing the voltage at the cathode of LED $122_n$ that is connected to operational amplifier 202 so that it appears at the inverting input terminal of operational amplifier 202. Reference voltage $V_{REF}$ is at the non-inverting input terminal of operational amplifier 202. In response to the input signals, operational amplifier 202 generates an error signal that is applied to switching regulator 112 to change, i.e., to increase or decrease, its output voltage and thereby adjust the voltage at the anode of LED $122_1$. The output voltage of switching regulator 112 is also referred to as a drive signal. Adjusting the voltage at the anode of LED $122_1$ in turn adjusts the voltage at the cathode of LED $122_n$ and therefore the voltage at node 117 to its target value where the voltage at node 117 is determined by subtracting the voltage appearing across LEDS $122_1, \ldots, 122_n$ from the drive signal, i.e., the voltage at the output terminal of switching regulator 112.

When the PWM pulse or signal is at a logic low voltage level, switches 104 and 106 are open. This portion of the pulse may be referred to as the second portion of the pulse. With switches 104 and 106 open, capacitor 204 provides the error signal representative of the voltage or error signal that appeared at the cathode of LED $122_n$ or node 117 when switches 104 and 106 were closed. The error signal maintains the feedback control loop in an active state even though the PWM pulse is at a logic low voltage level. The voltage stored by sample and hold capacitor 204 is referenced back to the anode of LED string $122_1, \ldots, 122_n$, which allows the error signal to be continuous in time for both the active and inactive phases of the PWM signal, e.g., the logic high state and the logic low state, respectively, of the PWM signal. In accordance with this approach, the operating voltage of the entire LED string $122_1, \ldots, 122_n$ is sensed during the active phase of the PWM signal and the anode of LED $122_1$ is sensed during the inactive phase of the PWM signal, thereby allowing switching regulator 112 to replenish the energy which is dissipated during the PWM pulse and maintain steady state conditions without loss of regulation.

By now it should be appreciated that a circuit having a sample and hold feedback control scheme and a method for operating the circuit have been provided. In accordance with an embodiment of the present invention, the sample and hold feedback control scheme enhances the PWM dimming performance for a switching regulator driving a current sensitive load such as, for example, a string of LEDS that use a constant current. The circuit and method include providing an error signal for a sufficient amount of time that allows the switching regulator to respond and deliver the output energy level equal to the energy dissipated during the PWM pulse, thereby satisfying a steady operating condition for the PWM dimming being applied. The error-signal is present and exists beyond the time interval of the associated PWM active pulse. By way of example, at the end of a PWM active pulse the cathode voltage of an LED or an LED string is stored on a sample and hold capacitor that is either internal or external to the integrated control circuit, the capacitor may be monolithically integrated with the control circuit. The stored error signal allows the feedback control to remain active even after the PWM pulse has been terminated. Optionally, a timer circuit can be used in conjunction with the sample and hold signal to extend the time of the feedback error signal being fed into a switching regulator, allowing it to replenish the energy dissipated during the PWM pulse. This maintains a steady state operation that accommodates the desired PWM timing intervals. The timing circuit can be a capacitor which allows the user to select the capacitance value and hence the timing to accommodate the response time delay of the switching regulator.

An advantage of embodiments of the present invention is that the total forward voltage of the LED diode string is being stored on the sample and hold capacitor allowing a switching regulator such as, for example, a DC/DC converter to respond to both the active phase and the inactive phase of the PWM pulse. Another advantageous feature is that the user can modify the anode signal contribution of the error signal by including a capacitive divider, e.g., two capacitors having the same capacitance value may be used where one of the capacitors is placed from the sample and hold node, e.g., the inverting input terminal of an operational amplifier, to ground so that the effective anode voltage contribution during the PWM off pulse is reduced by a factor of two. Thus, a user-controllable weighting factor may be introduced into the feedback error signal.

Another advantage is that embodiments can be used to compensate for second order effects such as system parasitic voltage losses like those associated with the bulk capacitor equivalent series resistance (ESR) present at the switching regulator output.

Although specific embodiments have been disclosed herein, it is not intended that the invention be limited to the disclosed embodiments. Those skilled in the art will recognize that modifications and variations can be made without departing from the spirit of the invention. It is intended that the invention encompass all such modifications and variations as fall within the scope of the appended claims.

What is claimed is:

1. The method for maintaining an operating state of a circuit, comprising:
    storing energy in a first energy storage element in response to a first portion of a pulse, wherein storing the energy in the first energy storage element comprises:
        using the first portion of the pulse to close first and second switches, wherein closing the first switch electrically couples a first node to the first energy storage element; and
        charging the first energy storage element in response to a first voltage at the first node, wherein charging the first energy storage element includes subtracting a voltage that is across a current sensitive load from a drive signal to generate the first voltage at the first node;
    using the energy stored in the first energy storage element during a second portion of the pulse to generate an error signal;
    using the error signal to generate the drive signal; and
    generating the first voltage at the first node from the drive signal, and using the first voltage at the first node to charge a second energy storage element.

2. The method of claim 1, further including delaying a falling edge of the pulse.

3. The method of claim 1, further including:
    using the second portion of the pulse to open the first and second switches; and
    applying the energy stored in the first energy storage element to an input terminal of an amplifier, wherein the error signal appears at an output terminal of the amplifier.

4. The method of claim 3, wherein using the error signal to generate the drive signal includes inputting the error signal to a switching regulator which outputs the drive signal.

5. The method of claim 3, further including using the first voltage at the first node to maintain a current source in an active mode.

6. The method of claim 1, wherein generating the first voltage at the first node includes subtracting a voltage across at least one light emitting diode from the drive signal.

7. The method of claim 1, wherein generating the first voltage at the first node from the drive signal includes generating a second voltage at a second node.

8. The method of claim 7,
    wherein closing the first and second switches creates first and second currents which flow through the first node and the second node, respectively.

9. The method of claim 8, further including subtracting a voltage that is across a second portion of the current sensitive load from the drive signal to generate the second voltage.

10. The driver circuit, comprising:
    an operational amplifier having first and second input terminals an output terminal;
    a switching regulator having an input terminal and an output terminal, the input terminal coupled to the output terminal of the operational amplifier;
    a first switch having a control terminal and first and second terminals, the control terminal coupled for receiving a control signal and the first terminal coupled to the first input terminal of the operational amplifier;
    a second switch having a control terminal and first and second terminals, the control terminal of the second switch coupled to the control terminal of the first switch and for receiving the control signal, and the first terminal of the second switch coupled to the second terminal of the first switch;
    a first current source having first and second current conducting terminals, the first current conducting terminal coupled to the second terminal of the second switch, wherein a current flowing through the current source and the second switch flows in the same direction;
    a first energy storage element having first and second terminals, the first terminal of the first energy storage element coupled to the first input terminal of the operational amplifier; and
    a second energy storage element having a first terminal commonly coupled to the first terminal of the first energy storage element and to the first input terminal of the operational amplifier and a second terminal coupled to the output terminal of the switching regulator.

11. The driver circuit of claim 10, further including a current sensitive load having first and second terminals, the first terminal commonly coupled to the second terminal of the second energy storage element and to the second terminal of the switching regulator.

12. The driver circuit of claim 11, wherein the current sensitive load comprises at least one diode having an anode and a cathode, the anode serving as the first terminal of the current sensitive load and the cathode serving as the second terminal of the current sensitive load.

13. The driver circuit of claim 11, wherein the current sensitive load comprises a first plurality of diodes coupled in series wherein an anode of one diode of the first plurality of diodes serves as the first terminal of the current sensitive load and a cathode of another diode of the first plurality of diodes serves as the second terminal of the current sensitive load.

14. The driver circuit of claim 13, further including a second plurality of diodes coupled in series wherein an anode of one diode of the second plurality of diodes is coupled to the anode of the first plurality of diodes and a cathode of another diode of the second plurality of diodes serves as the second terminal of the current sensitive load.

15. The driver circuit of claim 10, wherein the second terminal of the first energy storage element is coupled to the output terminal of the switching regulator.

16. A driver circuit, comprising:
an operational amplifier having first and second input terminals and an output terminal;
a first switch having a control terminal and first and second terminals, the control terminal coupled for receiving a control signal and the first terminal coupled to the first input terminal of the operational amplifier;
a second switch having a control terminal and first and second terminals, the control terminal of the second switch coupled to the control terminal of the first switch and for receiving the control signal, and the first terminal of the second switch coupled to the second terminal of the fist switch;
a first current source having first and second current conducting terminals, the first current conducting terminal coupled to the second terminal of the second switch, wherein a current flowing through the current source and the second switch flows in the same direction;
a first energy storage element having first and second terminals, the first terminal of the first energy storage element coupled to the first input terminal of the operational amplifier and the second terminal of the first energy storage element is coupled for receiving a source of operating potential, and wherein the first energy storage element is coupled for storing energy sampled from a load voltage in response to a first portion of an output dimming pulse; and further including:
a pulse width modulation delay element having an input terminal and first and second output terminals, the input terminal commonly connected to the control terminals of the first and second switches and for receiving the control signal; and
a second energy storage element having a first terminal coupled to the second output terminal of the pulse width modulation delay element and a second terminal coupled for receiving a first source of operating potential.

17. A driver circuit, comprising:
an operational amplifier having first and second input terminals and an output terminal;
a first switch having a control terminal and first and second terminals, the control terminal coupled for receiving a control signal and the first terminal coupled to the first input terminal of the operational amplifier;
a second switch having a control terminal and first and second terminals, the control terminal of the second switch coupled to the control terminal of the first switch and for receiving the control signal, and the first terminal of the second switch coupled to the second terminal of the first switch;
a first current source having first and second current conducting terminals, the first current conducting terminal coupled to the second terminal of the second switch, wherein a current flowing through the current source and the second switch flows in the same direction;
a first energy storage element having first and second terminals, the first terminal of the first energy storage element coupled to the first input terminal of the operational amplifier, wherein the first energy storage element is coupled for storing energy sampled from a load voltage in response to a first portion of an output dimming pulse, and further including:
a voltage selector having first and second input terminals and an output terminal, wherein the output terminal is connected to the second terminal of the first switch and the first input terminal is connected to the first terminal of the first current source;
a third switch having a control terminal and first and second terminals, the control terminal of the third switch coupled to the control terminal of the first switch and to the control terminal of the second switch and for receiving the control signal, and the first terminal of the third switch coupled to the second input terminal of the voltage selector; and
a second current source having first and second current conducting terminals, the first current conducting terminal coupled to the second terminal of the third switch.

* * * * *